(12) United States Patent
Lindvall

(10) Patent No.: US 7,051,680 B2
(45) Date of Patent: May 30, 2006

(54) ANIMAL KEEPING DEVICE AND A METHOD FOR ANIMAL KEEPING

(76) Inventor: Tommy Lindvall, Kvie Ekeby, Vishy (SE) S-621 70

( * ) Notice: Subject to any disclaimer, the term of this patent is extended or adjusted under 35 U.S.C. 154(b) by 0 days.

(21) Appl. No.: 10/471,418

(22) PCT Filed: Mar. 11, 2002

(86) PCT No.: PCT/SE02/00438

§ 371 (c)(1),
(2), (4) Date: Sep. 11, 2003

(87) PCT Pub. No.: WO02/071836

PCT Pub. Date: Sep. 19, 2002

(65) Prior Publication Data

US 2004/0134445 A1  Jul. 15, 2004

(30) Foreign Application Priority Data

Mar. 12, 2001  (SE) ................................. 0100830

(51) Int. Cl.
*A01K 15/02* (2006.01)
(52) U.S. Cl. ..................................................... 119/700
(58) Field of Classification Search .................... None
See application file for complete search history.

(56) References Cited

U.S. PATENT DOCUMENTS

| | | | |
|---|---|---|---|
| 4,361,115 A * | 11/1982 | Pike | 119/700 |
| 4,419,963 A | 12/1983 | Willibrordus | |
| 4,633,813 A * | 1/1987 | Tisserand et al. | 119/14.04 |
| 5,100,127 A * | 3/1992 | Melnick et al. | 119/700 |
| 5,816,190 A * | 10/1998 | van der Lely | 119/14.08 |

FOREIGN PATENT DOCUMENTS

| | | |
|---|---|---|
| EP | 0194730 | 9/1986 |
| EP | 0728413 | 8/1996 |

OTHER PUBLICATIONS

Derwent's abstract, No. 96-127338/13, week 9613, Abstract of RU, 2038764 (Kudashkin Yu L) Jul. 9, 1995.
Derwent's abstract, No. 90-244600/32, week 9032, Abstract of SU, 153483 (Altai Livestock Res), Jan. 15, 1990.
Derwent's abstract, No. 91-308440/42, week 9142, Abstract of SU, 1607750 (Selection Technique), Nov. 23, 1990.
Derwent's abstract, No. 89-330915/45, week 8945, Abstract of SU, 1456069 (Kabardino Balkarsk), Feb. 7, 1989.
Derwent's abstract, No. 94-157315/19, week 9419, Abstract of SU, 1797798 (Vaskhnil Podmoskove Res Prodn Assoc), Feb. 28, 1993.

* cited by examiner

*Primary Examiner*—Thomas Price
(74) *Attorney, Agent, or Firm*—Banner & Witcoff, Ltd.

(57) ABSTRACT

The invention relates to an animal keeping device comprising a floor (1), a tending device and a drive means (4) for the tending device. The tending device may be intended for cleaning or feeding. The purpose of the invention is to automate this work in a cost-effective manner. In accordance with the invention the floor (1) is vertically movable for the absorption of energy and is provided with energy-absorbing means (5) arranged to take up energy generated when an animal (2), due to its movement, subjects the floor to dynamic loading (F). The dynamic loading effects vetical movement of the floor (1). The energy-absorbing means (5) is arranged to provide the drive means (4) with energy. The invention also relates to a method for animal keeping wherein tending is performed using the device claimed.

11 Claims, 6 Drawing Sheets

ANIMAL KEEPING DEVICE AND A METHOD FOR ANIMAL KEEPING

TECHNICAL FIELD

The present invention relates firstly to an animal keeping device comprising a floor, tending device and drive means for the tending device. Secondly the invention relates to a method for animal keeping using such a device.

BACKGROUND ART

Animals need to be kept on a suitable surface that is continuously cleaned. Some kind of bedding material should be continuously strewn over the reclining areas. Some animals require such material to be strewn continuously to give them opportunity for normal behaviour as regards their instinct to grub or scratch, for instance.

The tending measures described above for feeding, strewing bedding, cleaning, etc. are traditionally extremely laborious. As animal production becomes increasingly rationalised, ways have been sought to fully or partially automate this tending.

Examples of devices whereby cleaning of the floor is automated are described in SU 1230 559, SU 1327 855, SU 1667 760, SU 1774 845 and SE 508 770. All these publications describe how a stall or animal box is provided with a movable floor in the form of an endless conveyor belt. This enables animal droppings to be continuously or intermittently removed and fodder and bedding can be fed forwards.

The devices known through the above publications entail expensive investment in order to connect external systems for supplying energy and suitable drive equipment. Added to this there is the cost of the energy supplied.

Examples are also known through RU 2038 764, SU 1456 069, SU 1797 798 and SU 1535 483 in which the animals' movement is utilised for tending measures.

Against this background the object of the present invention is to provide an animal keeping device and a method for animal keeping which, in a cost-effective manner, permit-far-reaching automation of animal tending.

DESCRIPTION OF THE INVENTION

In a first aspect of the invention this object is achieved by an animal keeping device of the type described in the preamble to claim 1 comprising the special features that the floor of the device is vertically movable for the absorption of energy and is provided with energy-absorbing means arranged to take up energy generated when an animal, due to its movement, subjects the floor to dynamic loading thereby effecting vertical movement of the floor, which energy-absorbing means is arranged to supply energy to the drive means driving the tending device.

The energy generated by the animals themselves being exploited in this manner and utilised to drive the tending devices thus eliminates energy costs for these devices. The costs for connection to external energy supply systems, as well as the machinery required therefor, are also eliminated. The invention thus enables cost-effective automation of feeding, spreading straw and cleaning. Since the floor is vertically movable for absorbing energy, this allows for a mechanically simple energy-absorbing device since a force, i.e. loading from the animal, presses the floor downwards a little way against resistance. The amount of energy will be the product of the load force and the vertical displacement.

Alternative preferred embodiments of the invention describe in one case the tending device comprising a supply device for fodder and/or bedding, straw, etc., and in the other case a cleaning device for removing waste products, and naturally a combination thereof.

In accordance with a preferred embodiment of the invention the floor is arranged to be movable in the direction of the floor plane and the floor is driven by the drive means. This is an expedient way to design the cleaning device from a practical point of view since the waste products are then transported on the floor away from the area where the animal is, and the waste products can easily be tipped off at one end of the floor. The solution is also suitable for supplying fodder and straw which are fed along the floor to where the animal is.

In accordance with a preferred embodiment of the invention the movable floor is in the form of an endless conveyor belt and the drive means comprises a drive roller for the conveyor belt. Such an embodiment of the movable floor constitutes a simple and expedient way of realising this and enables easy filling or emptying at either end of the floor.

In accordance with yet another preferred embodiment the floor is turnable about a vertical axis. Such a design may be advantageous in certain cases so that the vertical movement can be obtained at a part of the floor which, upon a turning movement, causes a deflection in vertical direction. The stroke length of the movement may in this case be extended by a lever action so that it is longer than the vertical movement the animal is subjected to.

In accordance with yet another preferred embodiment the floor is inclined in unloaded state. This can facilitate absorption of the energy-generating force at a distinct area of the floor, thereby facilitating its utilisation.

In accordance with yet another preferred embodiment of the invention the drive means is arranged to operate intermittently. Feeding can thus be performed at specific times. Similarly, cleaning can be carried out without the animal have to stand constantly on a moving floor which might create feelings of unrest in the animal.

In accordance with still another preferred embodiment the energy-absorbing device comprises energy-storage means. This offers better opportunity for making use of the energy and greater flexibility in exploiting it. The storage means is particularly valuable in the case of intermittent operation since energy can then be saved for measures that require relatively much power, only being used when necessary.

With intermittent operation and energy storage the time at which various measures are taken, e.g. when the drive means shall operate, can be pre-programmed for each individual animal or herd, or the drive means can be activated in response to sensors sensing the amount of animal droppings, for instance. Both variants can be combined so that, for instance, feeding and strewing fresh straw are performed in accordance with a program whereas cleaning is sensor-controlled.

In accordance with advantageous forms of the energy-storage means, this may be of pneumatic or hydraulic type or comprise weight, pendulum, mechanical spring or electric accumulator battery. Each storage principle has its advantages and disadvantages and the circumstances determine what is optimal.

The embodiments of the animal keeping device in accordance with the invention described above are defined in the sub-claims dependent on claim 1.

The second object of the invention is achieved by a method for animal keeping comprising the special measures of tending the animal using a device in accordance with the invention as defined in claim 1 or in any one of the sub-claims dependent on claim 1.

Such a method exhibits advantages equivalent to those described above with regard to the animal keeping device claimed and the preferred embodiments thereof and further description of the advantages of the method would appear to be superfluous.

The invention will be explained in more detail in the following description of advantageous embodiments thereof, with reference to the accompanying drawings.

DESCRIPTION OF PREFERRED EMBODIMENTS

Figure 1:
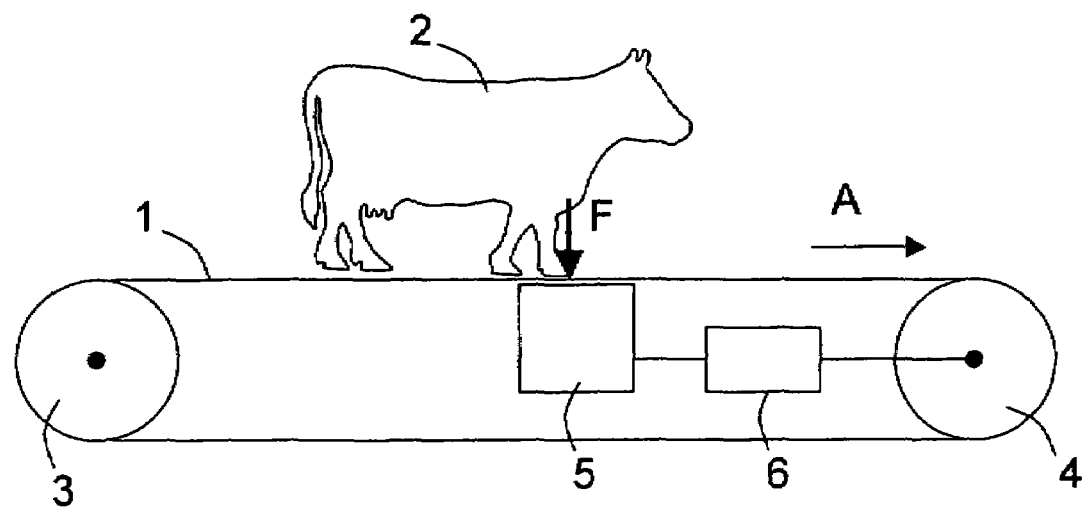
FIG. 1 is a side view of a first embodiment of a device in accordance with the invention.

FIG. 1 illustrates the basic principle of the invention and shows an animal 2, such as a cow, standing on the floor of a device in accordance with the invention. An endless conveyor belt 1 runs on the surface of the floor and over two rollers 3, 4. The right-hand roller 4 in the figure drives the conveyor belt 1 in the direction of the arrow A. Waste products such as animal droppings and fouled straw are thus transported by the belt 1 to its right-hand end and can there be caused to fall over the edge for further disposal. The floor in contact with the inner side of the belt 1 is provided with an energy-absorbing device 5. This is arranged to take up the energy generated when the animal 2 moves on the floor, the floor being influenced by a vertical force F every time the animal lifts a hoof and replaces it. The floor may, for instance, comprise a spring surface or be placed on springs in order to take up the energy thus generated.

The energy taken up by the energy-absorbing device 5 is used to drive the drive roller 4 so that the belt 1 is caused to move. This may occur in direct response to a movement of the animal 2. Alternatively energy can first be stored in the energy-storage device 6, as illustrated in the figure. Energy to drive the roller 4 can then be extracted intermittently, the belt normally being stationary and being caused to move only at specific times. The device may consist of an animal box for an individual animal, in which case the belt preferably covers the entire floor of the animal box. The device may also consist of a complete stall. In this case also the belt may cover the whole floor. Alternatively several belts may be used, each covering only a part of the floor. The drawing shows a cow by way of example but it should be understood that the invention is applicable to all sorts of domesticated animals such as horses, pigs, sheep, etc., and even smaller animals such as hens.

Figure 2:
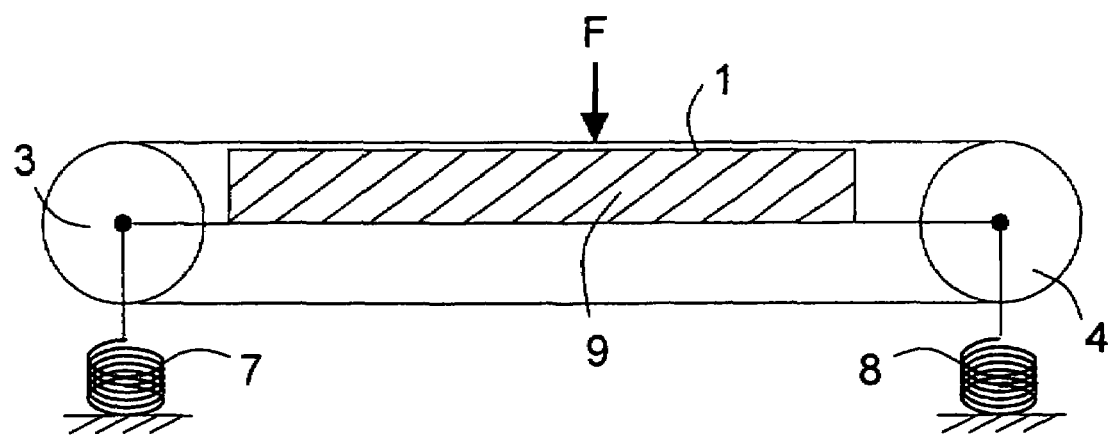
FIG. 2 is a similar view to that in FIG. 1, illustrating a second embodiment.

FIG. 2 illustrates how absorption of energy can be achieved by the floor 9 being movable in vertical direction. The floor 9 is supported via the shafts of the rollers 3, 4, by compression springs 7, 8 arranged at each roller. The force F from the animal causes vertical movement of the floor against the action of the springs 7, 8, whereupon an amount of energy is obtained corresponding to the force x the vertical displacement. Each movement of an animal gives rise to a relatively small amount of energy. However, summation of the energy increment from each movement provides an amount of energy quite sufficient for the purpose intended.

Figure 3:
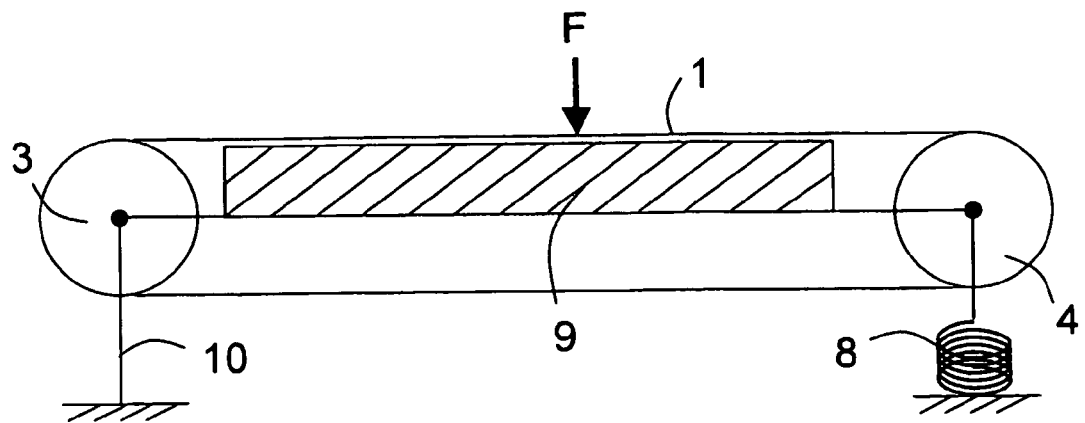
FIG. 3 is a similar view to that in FIG. 1, illustrating a third embodiment.

FIG. 3 agrees substantially with FIG. 2 but with the difference that the left-hand support 10 in this figure is rigid so that spring movement can only occur at the right-hand support, i.e. the spring 8.

Figure 4:
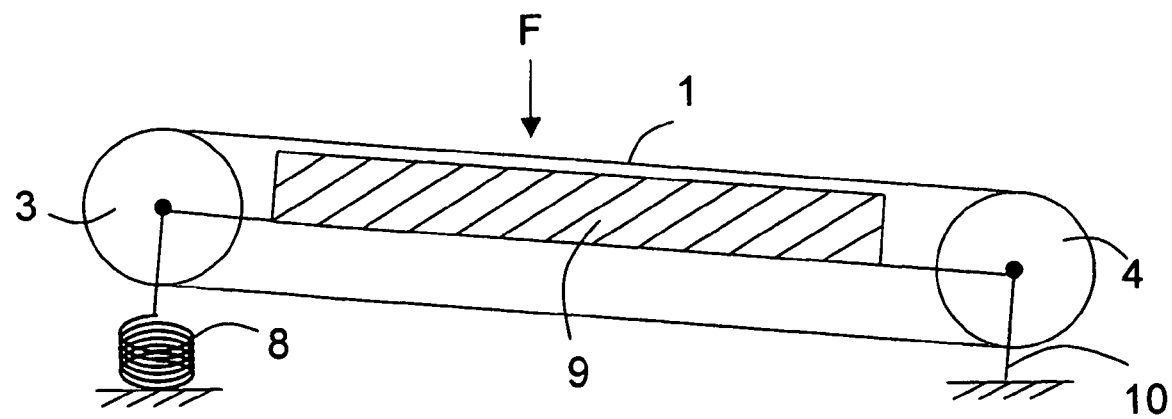
FIG. 4 is a similar view to that in FIG. 1, illustrating a fourth embodiment.

FIG. 4 shows an example in which the floor is slightly inclined (the figure exaggerates the inclination). In the example a fixed support 10 and a spring support 8 are provided as in FIG. 3. An inclined embodiment may also be used with two spring supports as shown in FIG. 2.

The examples in FIGS. 2–4 show how the floor is vertically movable via spring support at one or both of the roller shafts. The spring support may naturally be located directly beneath the actual floor 9 and support this.

FIGS. 5–9 illustrate various examples of how the energy-absorbing device can be realised and how the energy can be stored, if applicable.

Figure 5:
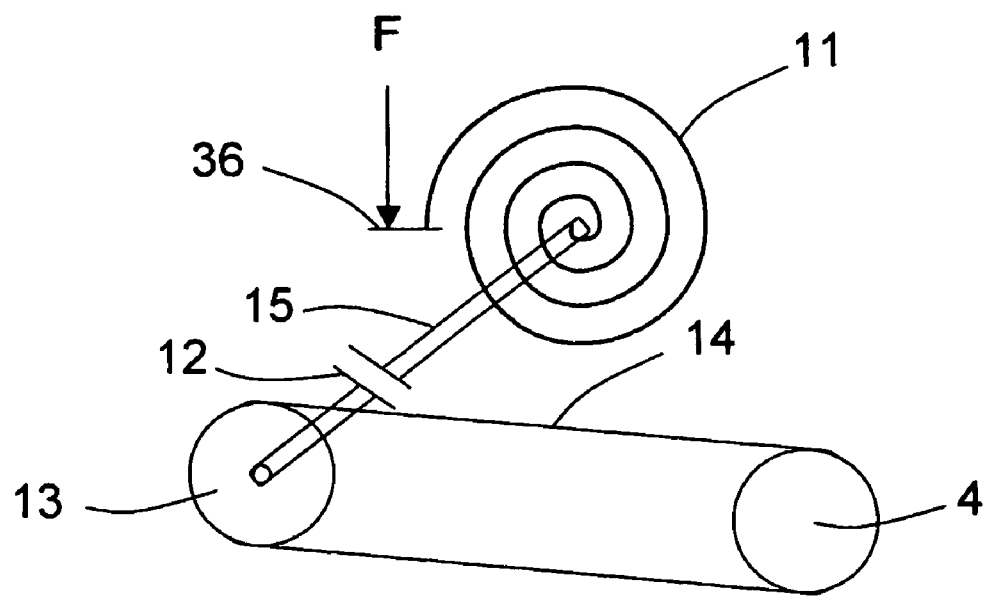
FIG. 5 illustrates a first embodiment of the energy-absorbing device in a device in accordance with the invention.

In FIG. 5 the energy is absorbed by the force F being applied against a stop 36 which is then moved a short distance. The stop 36 is then arranged to span a helical spring 11 to store the energy. The helical spring 11 is provided with a ratchet mechanism (not shown) which prevents return of the spring when the force is removed. Repeated movements tension the spring more and more so that a large amount of energy can be stored. Via a shaft 15 provided with coupling 12, the energy accumulated in the spring can drive one wheel 13 in a transmission 14 in order to drive the drive roller 4 shown in FIGS. 2–4.

Figure 6:
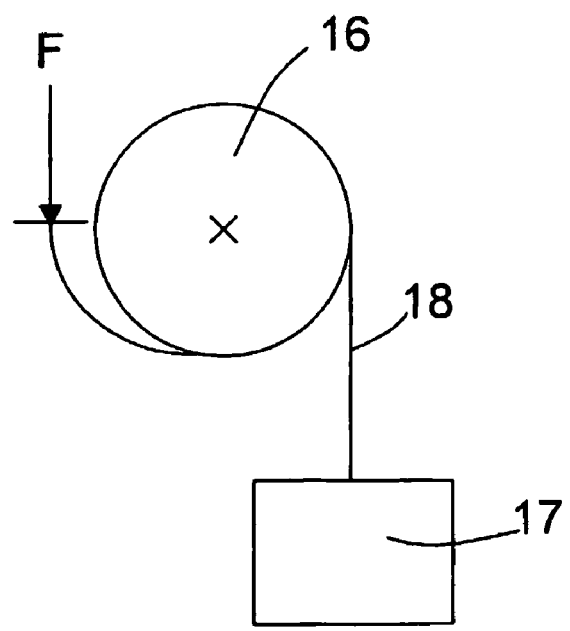
FIG. 6 illustrates a second embodiment of the energy-absorbing device in a device in accordance with the invention.

In FIG. 6 the force is applied on a ratchet wheel 16 that can normally only be turned anti-clockwise. A weight 17 is suspended in a cable 18 over the ratchet wheel. Repeated loading F on the periphery of the ratchet wheel 16 causes the weight 17 to be raised so that potential energy is stored. When the belt 1 in any of FIGS. 2–4 is to be caused to move, the ratchet wheel 16 is released so that it can rotate clockwise and the weight causes the ratchet wheel to rotate in that direction. The rotation of the ratchet wheel can then be transmitted to the drive roller 4 of the conveyor belt 1 in a similar manner to in FIG. 5.

Figure 7:
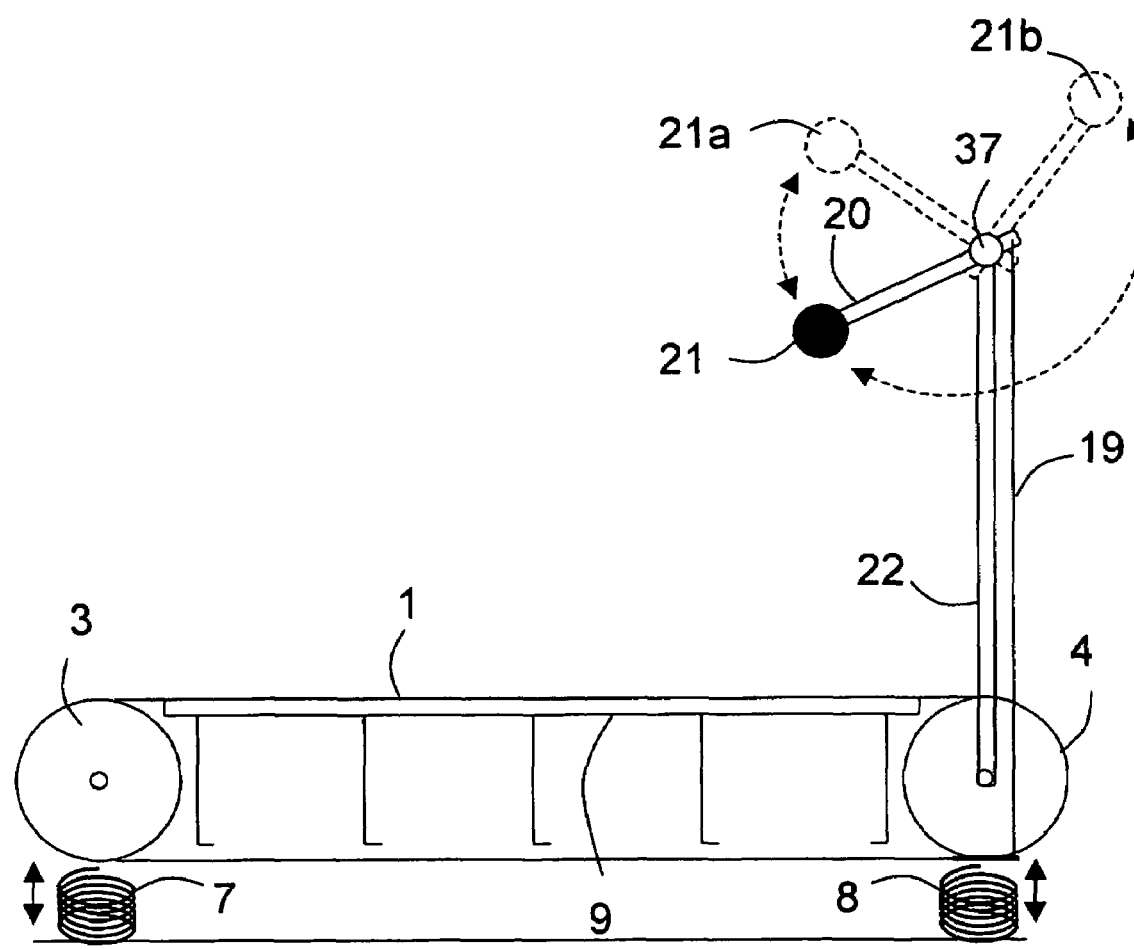
FIG. 7 illustrates a third embodiment of the energy-absorbing device in a device in accordance with the invention.

In the example illustrated in FIG. 7 the downward movement of the spring 8 is transmitted via a tension cord to one end of a pendulum 20 provided at one end with a weight 21. Due to lever action the weight is lifted to the position 21*a*, after which the pendulum is released so that it can swing back and perform a movement up towards the position designated 21*b*. This pendulum movement is in driving connection with a shaft 37 which, via a transmission belt 22, drives the roller 4 for transport of the belt 1.

Figure 8:
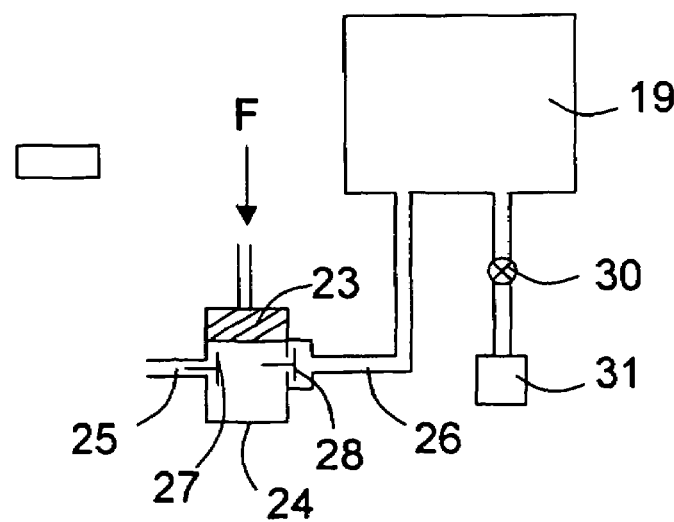
FIG. 8 illustrates a fourth embodiment of the energy-absorbing device in a device in accordance with the invention.

FIG. 8 illustrates a hydraulic energy-absorbing and energy-storage device. In this case the vertical force influences a piston 23 movable in a pump cylinder 24 provided with inlet 25 with non-return valve 27 and outlet 26 with non-return valve 28, so that the movement of the piston pumps liquid from the inlet 25 via the outlet up to a reservoir 29 where its potential energy is stored. Via a cut-off valve 30 the reservoir 29 communicates with a hydraulic motor 31 driving the roller 4 of the belt 1 (FIGS. 2–4). An arrangement like that in FIG. 8 may alternatively be pneumatic, in which case the container 29 is a compressed air tank and the motor 31 is a pneumatic motor.

Figure 9:
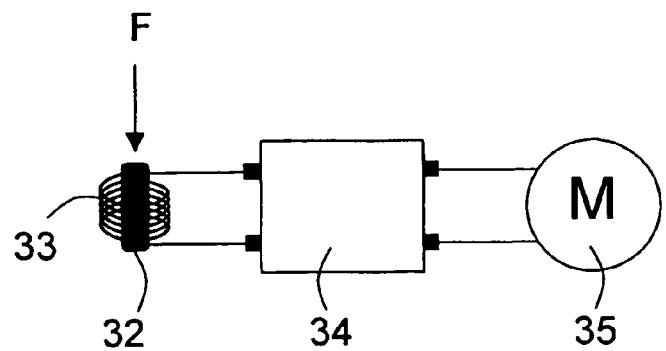
FIG. 9 illustrates a fifth embodiment of the energy-absorbing device in a device in accordance with the invention.

In the embodiment shown in FIG. 9 the energy is converted to electricity by a generator consisting of an iron core 32 displaceable by the force F in an induction coil. The induced current is stored in an accumulator battery 34 which supplies energy to an electric motor 35 to drive the roller 4.

Figure 10:
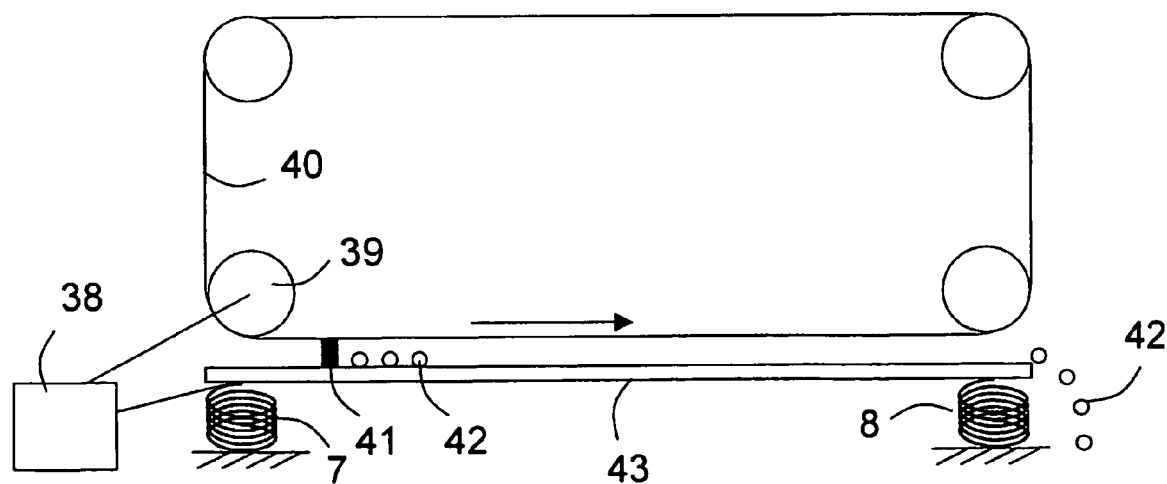
FIG. 10 is a side view of a fifth embodiment of a device in accordance with the invention.

FIG. 10 illustrates an alternative embodiment of the cleaning device for the floor. In this example the floor 43 is stationary, but vertically movable. The energy is absorbed and stored in one of the ways described above, in a unit 38 arranged to drive a drive roller 39 for a drive chain 40 running over each end of the roller. A scraper 41 is arranged at the drive chains 40 and extends at right angles to the plane of the figure. Several such scrapers may be arranged one after the other. When the drive roller 39 drives the chains 40 in the direction of the arrow, the scraper pushes the waste products in front of it until they are scraped over the edge of the floor (at 42*a*).

Figure 11:
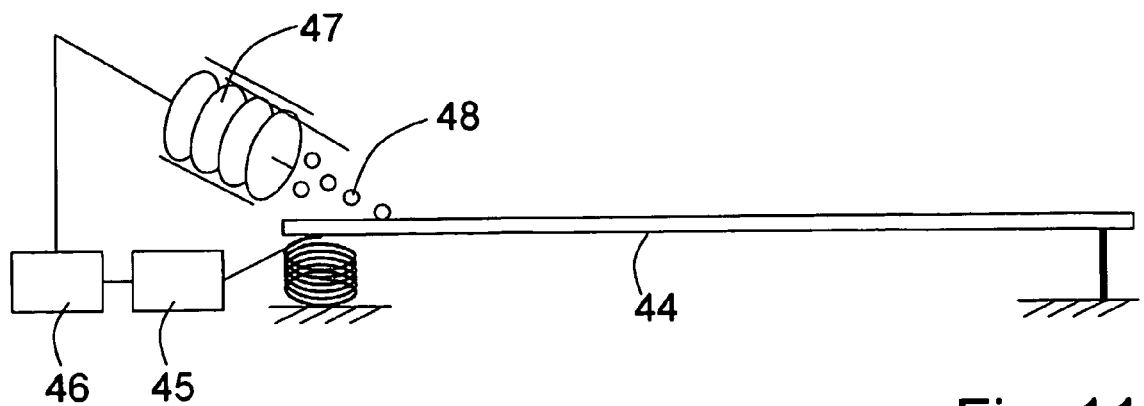
FIG. 11 is a side view of a sixth embodiment of a device in accordance with the invention.

FIG. 11 illustrates an alternative in which the energy obtained when the floor is moved vertically, via the energy-absorbing and energy-storage devices, drives a feeder for straw or fodder 48. The feeder may be a worm conveyor 47, for instance. The floor 44 may either be stationary or movable, as described above.

It will be understood that the embodiments illustrated in FIGS. 9–11 can be combined with each other to form an arrangement comprising a floor movable laterally, a floor scraper and a feeding device for fodder as well as a feeling device for straw. Additional functions can naturally be designed to supplement the arrangement and can obtain their energy from the animals' movements on the floor. An example is a flushing device.

Figure 12:
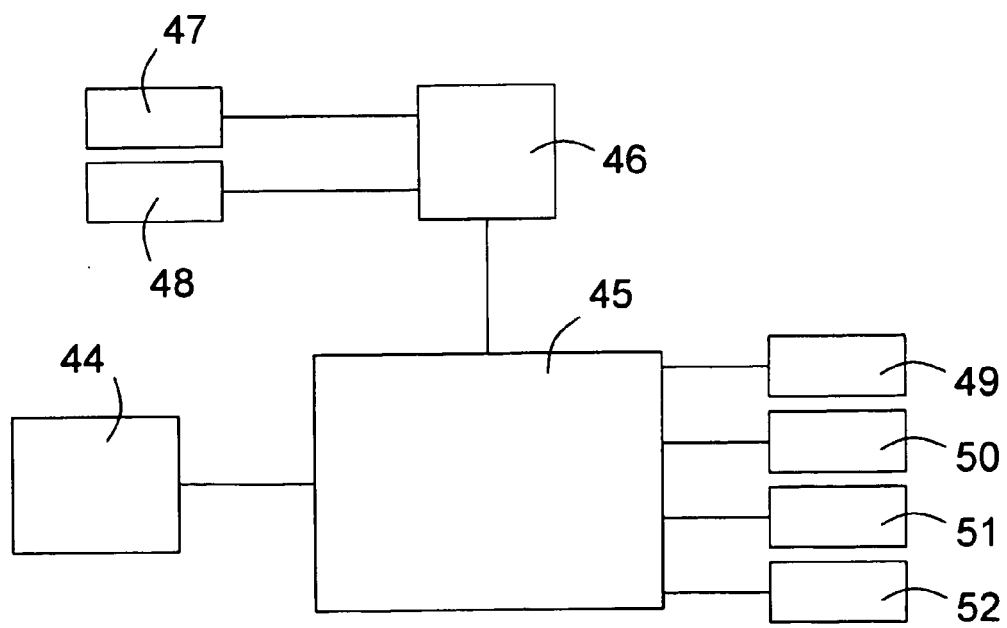
FIG. 12 is a block diagram illustrating a seventh embodiment.

FIG. 12 is a block diagram indicating how various functions can be integrated and controlled in an animal keeping device in accordance with the invention. 44 represents energy-absorbing means feeding energy to the energy-storage device 45 where these components may be designed in accordance with the examples described above or in some other suitable manner. The energy-storage unit supplies energy to drive the various functions 49–52, where 49 may represent a movable floor, 50 a scraper, 51 a fodder supply means and 52 a straw feeder. The supply of energy for these functions 49–52 is controlled by a control unit 46 that receives signals from a program in a microprocessor 47 and also from sensors 48. In response to these signals the control unit opens valves, switches a coupling, releases a back wheel ratchet or closes an electric circuit, depending on the type of the above-exemplified energy-storage principles applied. The device illustrated by the block diagram is relatively sophisticated and it should be understood that it may be reduced to varying extents as regards functions and method of control.

The invention claimed is:

1. An animal keeping device comprising a floor tending device and drive means for the tending device, wherein the floor, is vertically movable for the absorption of energy and is provided with energy-absorbing means arranged to take up energy generated when an animal, due to its movement, subjects the floor to dynamic loading (F) thereby effecting vertical movement of the floor, which energy-absorbing means is arranged to provide the drive means with energy.

2. An animal keeping device as claimed in claim 1, wherein the tending device comprises a cleaning arrangement for removing animal droppings from the floor.

3. An animal keeping device as claimed in claim 1, wherein the floor is arranged to be movable in the direction of the floor plane and in that the floor is arranged to be driven by the drive means.

4. An animal keeping device as claimed in claim 3, wherein the floor comprises an endless conveyor belt and the drive means comprises a drive roller for the conveyor belt.

5. An animal keeping device as claimed in claim 1, wherein the drive means is arranged to operate intermittently.

6. An animal keeping device as claimed in claim 1, wherein the energy-absorbing device comprises energy-storage means.

7. An animal keeping device as claimed in claim 6, wherein the energy-storage means comprises a mechanical storage means.

8. The animal keeping device as claimed in claim 6, wherein the mechanical storage means is a weight.

9. The animal keeping device as claimed in claim 6, wherein the mechanical storage means is a pendulum.

10. The animal keeping device as claimed in claim 6, wherein the mechanical storage means is a mechanical spring.

11. A method for animal keeping, wherein the animals are tended using a device as claimed in claim 1.

* * * * *